(12) United States Patent
Krebs

(10) Patent No.: US 12,425,997 B2
(45) Date of Patent: Sep. 23, 2025

(54) METHOD, COMPUTER PROGRAM AND TRANSCEIVER MODULE FOR ADAPTING A TIME SYNCHRONIZATION

(71) Applicant: Bayerische Motoren Werke Aktiengesellschaft, Munich (DE)

(72) Inventor: Alexander Krebs, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 366 days.

(21) Appl. No.: 17/922,957

(22) PCT Filed: Jan. 26, 2021

(86) PCT No.: PCT/EP2021/051661
§ 371 (c)(1),
(2) Date: Nov. 2, 2022

(87) PCT Pub. No.: WO2021/239274
PCT Pub. Date: Dec. 2, 2021

(65) Prior Publication Data
US 2023/0171723 A1 Jun. 1, 2023

(30) Foreign Application Priority Data
May 26, 2020 (DE) .................... 10 2020 114 097.5

(51) Int. Cl.
*H04W 56/00* (2009.01)
*H04L 69/28* (2022.01)
(Continued)

(52) U.S. Cl.
CPC ........... *H04W 56/002* (2013.01); *H04L 69/28* (2013.01); *H04L 7/00* (2013.01); *H04L 2027/0097* (2013.01); *H04L 27/2655* (2013.01)

(58) Field of Classification Search
CPC ......... H04W 56/00–0095; H04L 69/00; H04L 69/28; H04L 7/00; H04L 7/0016;
(Continued)

(56) References Cited

U.S. PATENT DOCUMENTS 10,567,035 B1   2/2020   Torborg
10,608,718 B2   3/2020   van Meurs et al.
(Continued)

FOREIGN PATENT DOCUMENTS

CN   102404103 A   4/2012
CN   105357752 A   2/2016
(Continued)

OTHER PUBLICATIONS

International Search Report corresponding to International Patent Application No. PCT/EP2021/051661, dated Apr. 20, 2021 (4 pages).
(Continued)

*Primary Examiner* — Warner Wong
(74) *Attorney, Agent, or Firm* — Maginot, Moore & Beck LLP

(57) ABSTRACT

A method adapts a time synchronization between a mobile device and a transceiver module of a plurality of transceiver modules, wherein the method is performed by the transceiver module. The method includes listening, in at least some of a plurality of time slots, for a time synchronization signal from a further transceiver module of the plurality of transceiver modules, wherein each time slot of the plurality of time slots is allocated to a corresponding transceiver module of the plurality of transceiver modules. The method also includes adapting the time synchronization when a received time synchronization signal has a higher estimated accuracy than the time synchronization between the mobile device and the transceiver module. The method further
(Continued)

includes transmitting a time synchronization signal for the further transceiver modules based at least in part on the time synchronization between the mobile device and the transceiver module.

15 Claims, 7 Drawing Sheets

(51) Int. Cl.
    *H04L 7/00* (2006.01)
    *H04L 27/00* (2006.01)
    *H04L 27/26* (2006.01)

(58) Field of Classification Search
    CPC ..... H04L 2012/5674; H04L 2027/0097; H04L 27/2655; H04B 7/2678; H04B 7/2684
    See application file for complete search history.

(56) References Cited

U.S. PATENT DOCUMENTS

| | | | | |
|---|---|---|---|---|
| 2005/0143074 | A1* | 6/2005 | Bassompierre ... | H04W 56/0015 455/444 |
| 2006/0030343 | A1* | 2/2006 | Ebner ................ | H04B 7/2696 455/503 |
| 2007/0086424 | A1 | 4/2007 | Calcev et al. | |
| 2015/0092753 | A1 | 4/2015 | Gupta et al. | |
| 2019/0007902 | A1 | 1/2019 | Khaled et al. | |
| 2020/0127808 | A1 | 4/2020 | Takahashi | |
| 2022/0103279 | A1* | 3/2022 | Angeli ............... | H04J 3/0641 |
| 2022/0330181 | A1* | 10/2022 | Kolding ............ | H04W 56/0015 |

FOREIGN PATENT DOCUMENTS

| | | | | |
|---|---|---|---|---|
| CN | 105491656 | A | 4/2016 | |
| CN | 107079402 | A | 8/2017 | |
| DE | 10106807 | A1 * | 9/2002 | ........... H04B 7/2662 |
| EP | 3385745 | A1 | 10/2018 | |
| WO | WO-02065669 | A2 * | 8/2002 | ........... H04B 7/2662 |
| WO | 2010029822 | A1 | 3/2010 | |

OTHER PUBLICATIONS

German Search Report corresponding to German Patent Application No. 10 2020 114 097.5, dated Jan. 16, 2021 (6 pages).

Chinese Office Action corresponding to Chinese Patent Application No. 202180030980.8, dated Jan. 21, 2025 (9 pages).

English Translation of Chinese Office Action corresponding to Chinese Patent Application No. 202180030980.8, dated Jan. 21, 2025 (10 pages).

English Translation of WO2010029822A1. (14 Pages).

Chinese Office Action corresponding to Chinese Application No. 202180030980.8, dated Oct. 16, 2024 (7 pages).

English Translation of Chinese Office Action corresponding to Chinese Application No. 202180030980.8, dated Oct. 16, 2024 (9 pages).

* cited by examiner

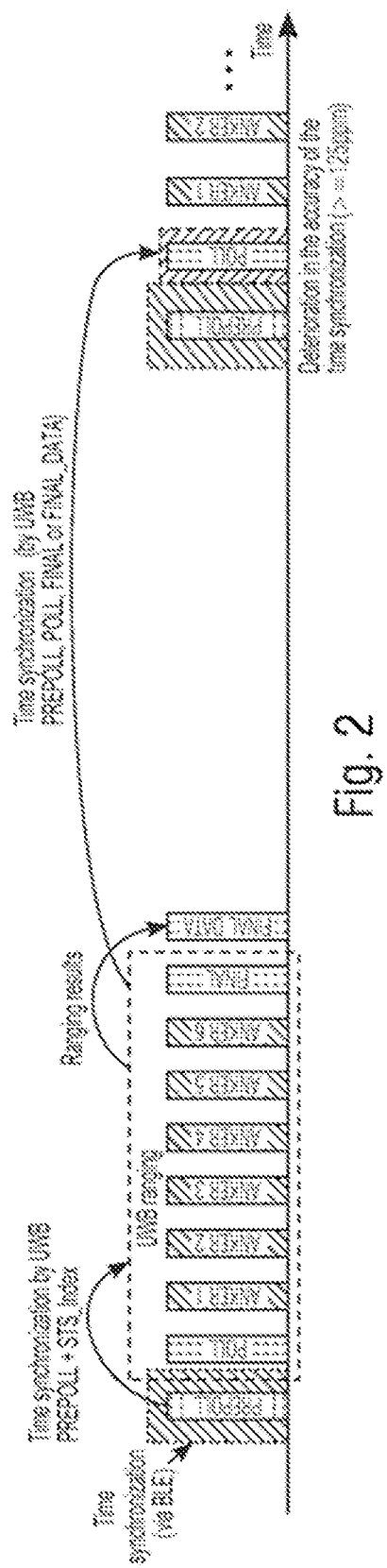

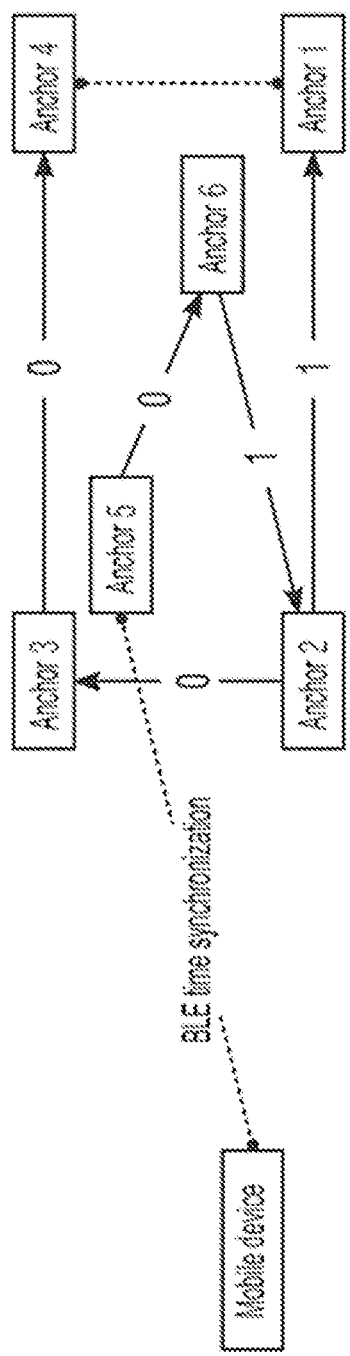

METHOD, COMPUTER PROGRAM AND TRANSCEIVER MODULE FOR ADAPTING A TIME SYNCHRONIZATION

The present application is the U.S. national phase of PCT Application No. PCT/EP2021/051661, filed on Jan. 26, 2021, which claims priority of German patent application No. 10 2020 114 097.5, filed on May 26, 2020, which is incorporated herein by reference in its entirety.

TECHNICAL FIELD

Exemplary embodiments are concerned with a method, a computer program and a transceiver module for adapting a time synchronization between a mobile device and a transceiver module of a plurality of transceiver modules.

BACKGROUND

The periodic localization of a mobile transceiver apparatus by a vehicle having a plurality of installed transceiver apparatuses, for instance by means of the protocol presented in the IEEE 802.15.4 standard from the Institute of Electrical and Electronics Engineers, involves a particularly high energy consumption at the vehicle transceiver apparatuses when the mobile transceiver apparatus is not situated within the radio range of the vehicle transceiver apparatuses.

The method for secure ranging specified in the IEEE 802.15.4 standard (for example by double-sided two-way ranging (DS-TWR) in IEEE 802.15.4, where "ranging" is equivalent to measuring a distance) by exchanging special radio messages of large spectral bandwidth can be used to localize the mobile transceiver apparatus. For the method specified in IEEE 802.15.4, this can be done by the transceiver apparatuses installed in the vehicle initially receiving a radio message sent by the mobile transceiver apparatus. Since the mobile transceiver apparatus and the transceiver apparatuses installed in the vehicle in general have no shared knowledge of the time at the point of sending, the transceiver apparatuses installed in the vehicle can expect and facilitate the reception of radio messages at any time.

After the mobile transceiver apparatus enters the radio range of one of the transceiver apparatuses installed in the vehicle, and the transceiver apparatus installed in the vehicle has received a radio message from the mobile transceiver apparatus, the transceiver apparatus concerned in the vehicle can reduce its energy consumption by deactivating itself until the next periodic localization, and only reactivating itself again shortly before the time instant of the localization that is due next.

Since the transceiver apparatuses installed in the vehicle are spatially distributed, the entry of the mobile transceiver apparatus into the radio range of a particular transceiver apparatus installed in the vehicle results in just reducing the power consumption at one particular transceiver apparatus installed in the vehicle. For the specific case in which a plurality of the transceiver apparatuses installed in the vehicle are connected to a common bus system, the time synchronization information can be distributed among the transceiver apparatuses installed in the vehicle, so that these can likewise implement a reduction in the energy consumption by applying the information to the periodic radio procedures in the manner described above. A bus protocol that is suitable for this is standardized in IEEE 1588 and is known as the Precision Time Protocol (PTP). In order to be able to distribute the time synchronization information suitably in accordance with IEEE 1588, the underlying bus system should fulfill specific attributes, which are not typically present in a vehicle databus system, for instance LIN (Local Interconnect Network) bus systems and CAN (Controller Area Network) bus systems, for instance.

Thus, if the transceiver apparatuses installed in the vehicle do not have such a connection available via the vehicle bus network, it is not possible to reduce the energy consumption throughout the vehicle.

SUMMARY

There is a need to provide a better approach to reducing the energy consumption of a grouping of transceiver modules, for example in a vehicle.

The exemplary embodiments of the present disclosure address this need.

Exemplary embodiments of the present disclosure are based on the finding that the technology that is used for the time synchronization between a mobile device (a mobile transceiver apparatus) and a transceiver module (for instance a transceiver apparatus for a vehicle) can be adapted in order to pass on the time synchronization amongst the transceiver modules. Thus, for example, one of the transceiver modules may have highly accurate time synchronization with the mobile device, and on the basis thereof, provide the other transceiver modules with a time synchronization signal, which they can then use to adapt their own time synchronization and thereafter have improved time synchronization with the mobile device. This can be done by using time slots which, in the communication by the relevant transceiver modules, are provided in addition to the time slots provided for the ranging between mobile device and transceiver module. For example, the time synchronization can deteriorate over time as a result of time-drift between the crystal-based oscillators that are used in the mobile device and the transceiver modules. In addition, time synchronization methods having different properties and different accuracy could be used successively in time, with the sequence being dependent on the situation and not known in advance. Hence for the time synchronization between mobile device and transceiver module and between the transceiver modules, the time synchronization can be adapted if the received time synchronization signal is more accurate than the previously used time synchronization. On the basis of the improved time synchronization, the receiving behavior of the transceiver modules can now be adapted so that a corresponding transceiver module has to be ready to receive for a shorter time. This allows the energy consumption of all the transceiver apparatuses installed in the vehicle to be reduced by virtue of distributing the information needed for this purpose by extending the radio protocol specified for the localization of the mobile transceiver apparatuses.

Exemplary embodiments of the present disclosure provide a method for adapting a time synchronization between a mobile device and a transceiver module of a plurality of transceiver modules. The method is performed by the transceiver module. The method comprises listening, in at least some of a plurality of time slots, for a time synchronization signal from a further transceiver module of the plurality of transceiver modules. Each time slot of the plurality of time slots is allocated to a transceiver module of the plurality of transceiver modules. The method also comprises adapting the time synchronization if a received time synchronization signal has a higher estimated accuracy than the time synchronization between the mobile device and the transceiver module. The method also comprises transmitting a time synchronization signal for the further transceiver modules on the basis of the time synchronization between the mobile device and the transceiver module. The time synchronization can be exchanged at least between the transceiver modules by the receiving and transmission of time synchronization signals. In addition, the local time synchronization can be adapted if the received time synchronization signal is more accurate than the previously used time synchronization. As already stated, this makes it possible to reduce the energy consumption of the transceivers of the transceiver module.

In some exemplary embodiments, the received and the transmitted time synchronization signal can comprise information about the estimated accuracy of the time synchronization signal concerned. The receiving transceiver module concerned can thereby assess whether the received time synchronization signal is more accurate than the current time synchronization being used by the transceiver module concerned.

For example, the method can comprise adapting an estimated accuracy of the time synchronization on the basis of a length of time since the last adaptation of the time synchronization, on the basis of an estimated accuracy of the time synchronization signal on which the last adaptation of the time synchronization is based, and on the basis of an accuracy of a clock of the transceiver module. The deterioration in the time synchronization as a result of the time-drift between the crystal oscillators can hence be taken into account.

In some exemplary embodiments, the method further comprises listening, in a predefined time slot, for a time synchronization signal from the mobile device. The time synchronization with the mobile device can thereby be adapted directly on the basis of the signal from the mobile device, and then relayed accordingly to the further transceiver modules.

For example, listening for the time synchronization signal can be performed if the accuracy of the time synchronization is worse than a threshold value. In other words, the time synchronization is not adapted until the quality of the time synchronization is no longer high enough, allowing energy to be saved during that time.

The method can also comprise adapting, on the basis of the adapted time synchronization, a time period intended for receiving signals by a transceiver of the transceiver module. Adapting the time period intended for receiving signals can, for example, reduce the time period, whereby energy can be saved.

For example, the time period intended for receiving signals by the transceiver can be adapted, for receiving a positioning signal from the mobile device, on the basis of the adapted time synchronization. This can avoid the need for the particular transceiver to remain activated over a prolonged time period for the purpose of ranging.

For example, the time synchronization signal from the further transceiver module may be based on an ultra-wideband (UWB) transmission technology. In other words, the time synchronization can be relayed between the transceiver modules by means of UWB. The time synchronization signal from the mobile device can be based on an ultra-wideband transmission technology or a Bluetooth transmission technology (for instance Bluetooth Low Energy (BLE or Bluetooth LE)). In other words, the original time synchronization between mobile device and transceiver module can be based on UWB or Bluetooth LE.

In different exemplary embodiments, the plurality of transceiver modules can be arranged at different positions in a vehicle. For example, the transceiver modules can be used to determine the position of the mobile device relative to the vehicle. Exemplary embodiments also provide a vehicle comprising the transceiver module or the plurality of transceiver modules.

Exemplary embodiments of the present disclosure also provide a program comprising a program code for performing the method when the program code is executed on a computer, a processor, a control module, or a programmable hardware component.

Exemplary embodiments of the present disclosure also provide a transceiver module comprising one or more processors and one or more transceivers. The transceiver module is designed to adapt a time synchronization between a mobile device and the transceiver module by listening by means of the transceiver, in at least some of a plurality of time slots, for a time synchronization signal from a further transceiver module of the plurality of transceiver modules. Each time slot of the plurality of time slots is allocated to a transceiver module of a plurality of transceiver modules. The plurality of transceiver modules comprises the transceiver module. The transceiver module is also designed to adapt the time synchronization if a received time synchronization signal has a higher estimated accuracy than the time synchronization between the mobile device and the transceiver module. The transceiver module is also designed to transmit, by means of the transceiver, a time synchronization signal for the further transceiver modules on the basis of the time synchronization between the mobile device and the transceiver module.

DESCRIPTION OF THE FIGURES

A few examples of devices and/or methods are explained in greater detail below purely by way of example with reference to the accompanying figures, in which:

FIG. 2 shows a timing diagram of time synchronization between a mobile device and a transceiver module;

FIG. 3 shows a timing diagram of time synchronization between a mobile device and a transceiver module and between different transceiver modules;

FIG. 5a shows an example network diagram of a network comprising a mobile device and a plurality of transceiver modules;

DESCRIPTION

Various examples are now described in greater detail with reference to the accompanying figures, which show a few examples. The thicknesses of lines, layers and/or regions may be exaggerated in the figures for the purpose of illustration.

It shall be understood that if an element is described as "connected" or "coupled" to another element, the elements can be connected or coupled directly or via one or more intermediate elements. If "or" is used to combine two elements A and B, this shall be understood to mean that all possible combinations are disclosed, i.e. just A, just B, and A and B, unless specified otherwise explicitly or implicitly. An alternative wording for the same combinations is "at least one of A and B" or "A and/or B". The same applies mutatis mutandis to combinations of more than two elements.

Unless defined otherwise, all the terms (including technical and scientific terms) are used here in the sense in which they are usually meant within the field associated with the examples.

Figure 1A:
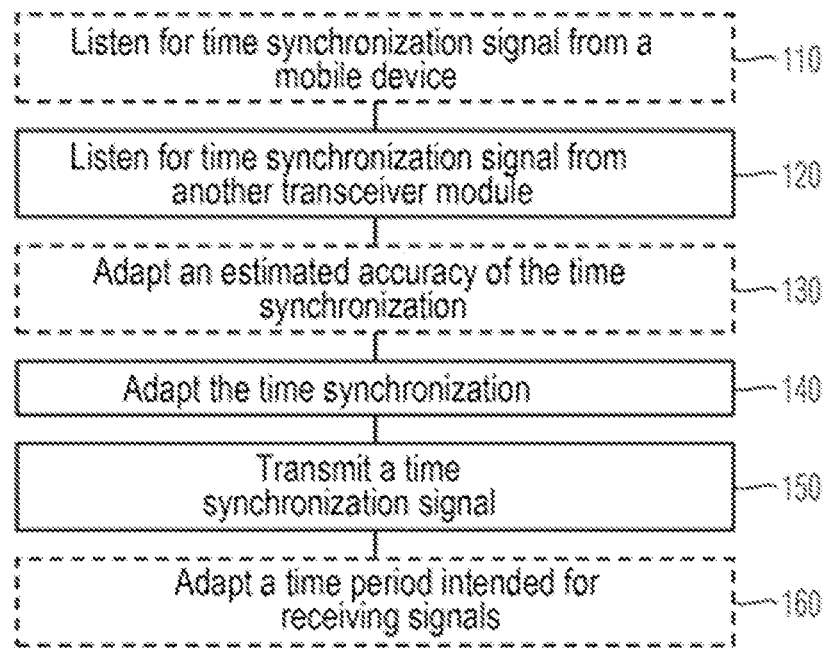
FIG. 1a shows a flow diagram of an exemplary embodiment of a method for adapting a time synchronization.
Figure 1B:
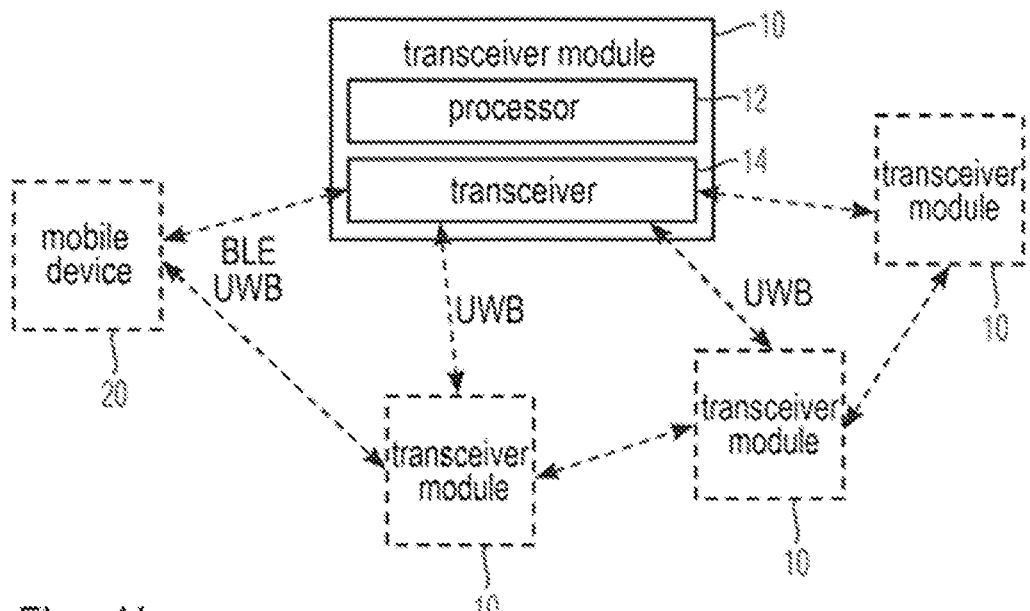
FIG. 1b shows a block diagram of an exemplary embodiment of a transceiver module for adapting a time synchronization.

FIG. 1a shows a flow diagram of an exemplary embodiment of a method for adapting a time synchronization between a mobile device 20 and a transceiver module 10 of a plurality of transceiver modules. The method is performed by the transceiver module. In particular, the method can be performed by each of the transceiver modules. For example, FIG. 1b shows the plurality of transceiver modules 10, each of which can perform the method. The method comprises listening 120, in at least some of a plurality of time slots, for a time synchronization signal from a further transceiver module of the plurality of transceiver modules. Each time slot of the plurality of time slots is allocated to a transceiver module of the plurality of transceiver modules. The method also comprises adapting 140 the time synchronization if a received time synchronization signal has a higher estimated accuracy than the time synchronization between the mobile device and the transceiver module. The method also comprises transmitting 150 a time synchronization signal for the further transceiver modules on the basis of the time synchronization between the mobile device and the transceiver module.

FIG. 1b shows a block diagram of an exemplary embodiment of a corresponding transceiver module 10, which is designed to adapt the time synchronization. The transceiver module 10 comprises one or more processors 12 and one or more transceivers 14, which are coupled to the one or more processors. A processing functionality of said transceiver module can be provided, for example, by a processor, whereas the communication is performed by means of the one or more transceivers. The transceiver module is designed to adapt the time synchronization between the mobile device 20 and the transceiver module 10 by performing the method of FIG. 1a. In particular, the transceiver module is designed to listen by means of the transceiver, in at least some of a plurality of time slots, for a time synchronization signal from a further transceiver module of the plurality of transceiver modules. Said plurality of transceiver modules comprises the transceiver module. The transceiver module is designed to adapt the time synchronization if a received time synchronization signal has a higher estimated accuracy than the time synchronization between the mobile device and the transceiver module. The transceiver module is designed to transmit, by means of the transceiver, a time synchronization signal for the further transceiver modules on the basis of the time synchronization between the mobile device and the transceiver module.

Exemplary embodiments of the present disclosure relate to a method, to a computer program and to a transceiver module for adapting a time synchronization between a mobile device and a transceiver module of the plurality of transceiver modules. In the scenario described here, direct or indirect time synchronization of the mobile device with the (for instance each of the) plurality of transceiver modules takes place. Time synchronization of this type may be desirable in a vehicle scenario, for example. For instance, the vehicle can comprise the plurality of transceiver modules. The plurality of transceiver modules may be arranged, for instance, at different positions in the vehicle. For example, a transceiver module may be arranged at each of the four outer corners of the vehicle (for instance in the fenders), and one or more transceiver modules may be arranged in the interior of the vehicle. FIGS. 5a to 6b give an example of this, where in each case the plurality of transceivers comprises six transceivers. In general, the transceiver modules are designed to communicate via a wireless transmission technology. In particular, the presented time synchronization signals are wireless time synchronization signals. The transceiver modules may be designed, for example, to communicate via a first (wireless) transmission technology, for instance via the ultra-wideband transmission technology (UWB). At least a subset of the transceivers may also be designed to communicate via a second (wireless) transmission technology, for instance via a Bluetooth-based transmission technology such as Bluetooth Low Energy (BLE). In this case, the transceiver modules can each comprise separate transceivers for each of the transmission technologies, for instance separate transceivers for UWB and BLE (or just UWB, if only UWB is supported). In transceiver modules, it is also possible to be coupled to a Controller Area Network bus (CAN bus) or to a Local Interconnect Network (LIN) by a transceiver for wired communication, for instance for communicating with control units of the vehicle. The mobile device may be a mobile phone, for instance a programmable mobile phone (smartphone), for example. Alternatively, for instance, the mobile device may be what is known as a "wearable" device (a mobile device that can be worn on the body) or a key device (key fob) for the vehicle. In exemplary embodiments, the mobile device may be designed to communicate with the transceiver modules by means of UWB and/or BLE. Said communication between the mobile device and the plurality of transceiver modules (so also the transceiver module) can be intended for determining a position of the mobile device relative to the vehicle.

Figure 5B:
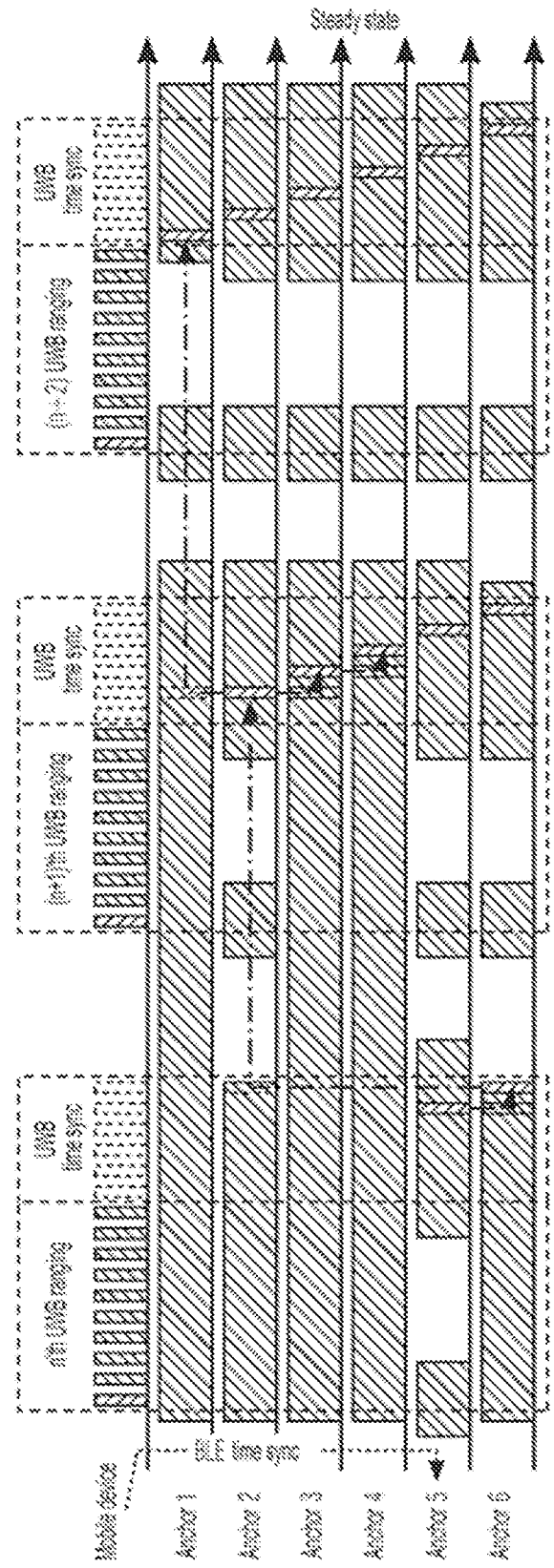
FIG. 5b shows an example timing diagram of time synchronization between a mobile device and a transceiver module and between different transceiver modules, where the original time synchronization is performed by means of Bluetooth Low Energy.
Figure 6A:
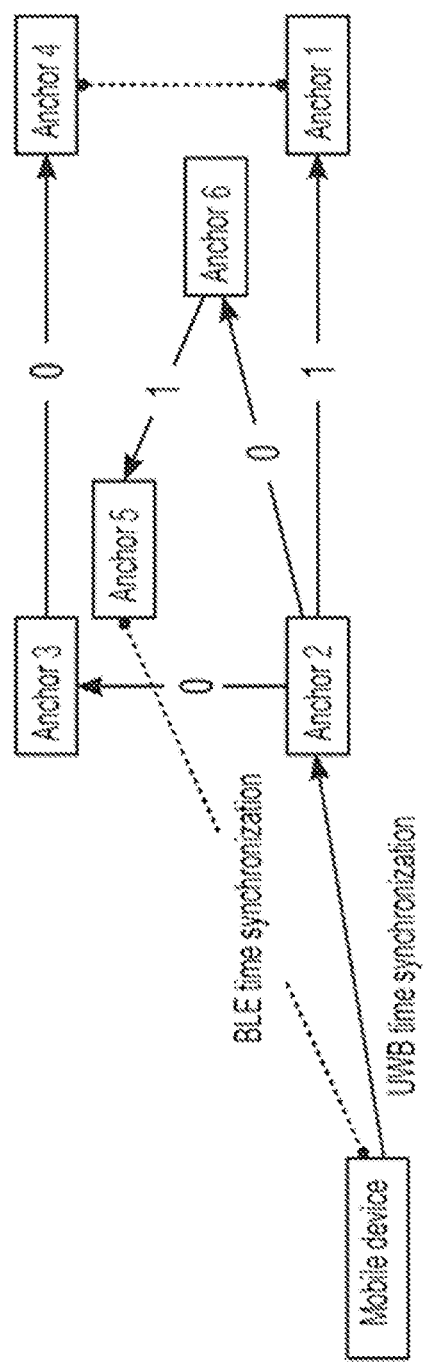
FIG. 6a shows an example network diagram of a network comprising a mobile device and a plurality of transceiver modules.
Figure 6B:
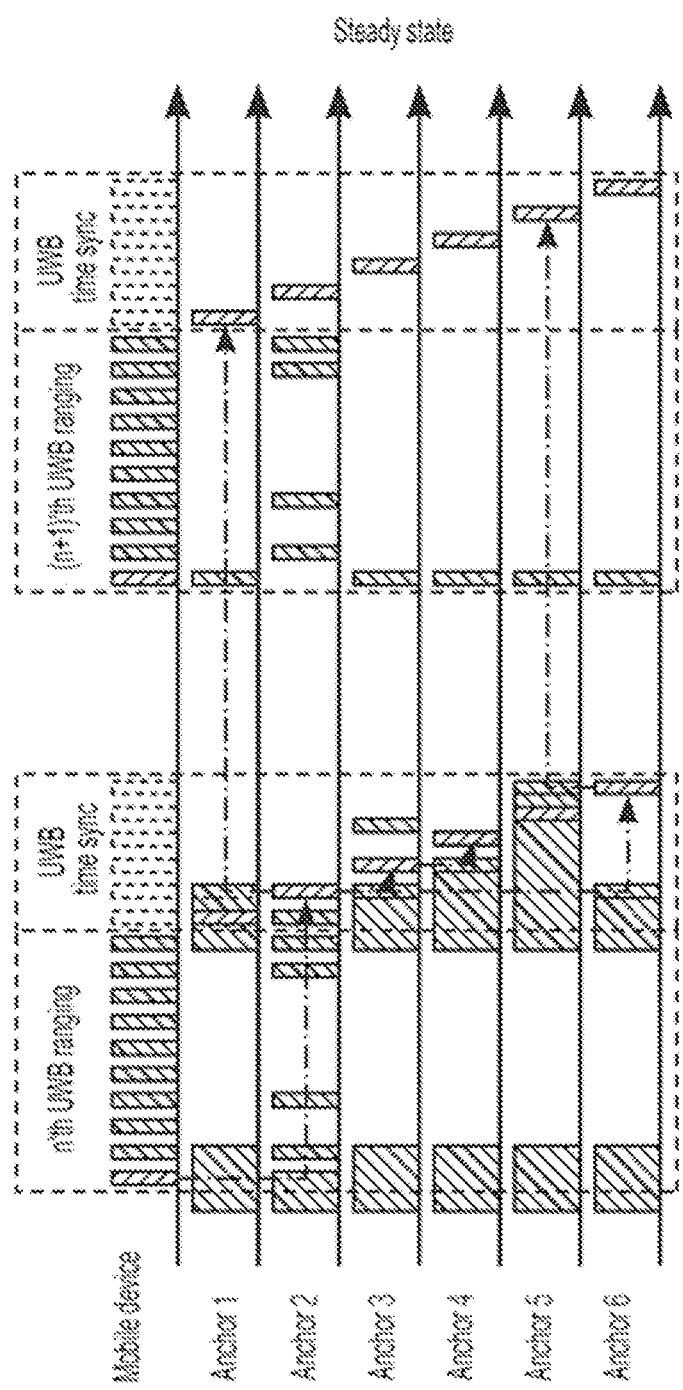
FIG. 6b shows an example timing diagram of time synchronization between a mobile device and a transceiver module and between different transceiver modules, where an additional time synchronization is performed by means of UWB.

In principle, two different time synchronization signals can be used for the time synchronization: time synchronization signals from a further transceiver module (not including the mobile device), and time synchronization signals from the mobile device. The method can accordingly optionally comprise listening 110, in a predefined time slot, for a time synchronization signal from the mobile device. In FIGS. 2 to 6b, the predefined time slot is shown generally as the "UWB ranging time window". In particular, two time intervals of this time window are of interest: a time interval in which a time synchronization packet (also referred to below as a PREPOLL signal) can be received, and a time interval in which a ranging start packet (also referred to below as a POLL signal) can be received. FIGS. 5b and 6b show only the time intervals for UWB communication. The predefined time slot can accordingly be a predefined time slot for receiving UWB-based time synchronization signals. Alternatively, the time synchronization signal from the mobile device may also be a BLE-based time synchronization signal. The predefined time slot can accordingly be a predefined time slot for receiving BLE-based time synchronization signals. Also a combination can be possible. For instance the transceiver module can listen for the time synchronization signal from the mobile device in a predefined time slot for receiving BLE-based time synchronization signals, and in a (further) predefined time slot for receiving UWB-based time synchronization signals from the mobile device. These possible embodiments are not shown in FIGS. 2 to 6b, however; although BLE-time synchronization is used there for roughly delimiting the time period for receiving the UWB time synchronization packet (in FIG. 2 evident for instance at the frame around the PREPOLL packet), the time slot used for the BLE time synchronization is not shown. Thus the time synchronization signal from the mobile device can be based on an ultra-wideband transmission technology or on a Bluetooth transmission technology (for instance BLE). In the context of the present disclosure, "listening" can refer to when a receive component of a transceiver of the transceiver module is activated and ready to receive signals. In other words, "listening" corresponds to activating a receive component of a transceiver of the transceiver module. In addition, a particular time synchronization signal can correspond to a time synchronization packet that is transmitted via the particular transmission technology.

The method further comprises listening 120, in at least some of a plurality of time slots, for a time synchronization signal from a further transceiver module of the plurality of transceiver modules. Each time slot of said plurality of time slots is allocated to a transceiver module of the plurality of transceiver modules. Thus the "listening" can relate to those time slots of the plurality of time slots that are allocated to the further transceiver modules of the plurality of transceiver modules. A corresponding plurality of time intervals is shown in FIGS. 3 to 6b as the time intervals for the UWB time synchronization. For example, the time synchronization signal from the further transceiver module can be based on the UWB transmission technology.

The method also comprises adapting 140 the time synchronization if a received time synchronization signal has a higher estimated accuracy than the time synchronization between the mobile device and the transceiver module. The "estimated accuracy of the time synchronization" here can define the maximum difference there can be between the time synchronization of the transceiver module or of the time synchronization signal and the time used by the mobile device. The accuracy of the time synchronization between the mobile device and the can decrease continuously over time until it is increased again by time synchronization with the mobile device by means of a time synchronization signal from the mobile device (or by a further transceiver module relaying the time synchronization).

In order to make this decision, the level of the estimated accuracy of the (current) time synchronization between the mobile device and the transceiver module can be ascertained, and the estimated accuracy of the received time synchronization signal can be ascertained. For the latter, the relevant time synchronization signal can contain, for example, information about the level of the estimated accuracy of the time synchronization signal concerned. In other words, the received and the transmitted time synchronization signal can comprise information about the estimated accuracy of the time synchronization signal concerned.

For the current time synchronization, the transceiver module can itself determine the estimated accuracy. In this case, the estimated accuracy of the time synchronization can be based originally on the estimated accuracy of the time synchronization signal from which the time synchronization was derived. This estimated accuracy can then be reduced in value continuously depending on a maximum drifting apart of the clocks of the mobile device and of the transceiver module concerned. Hence the method can comprise adapting 130 the estimated accuracy of the time synchronization on the basis of a length of time since the last adaptation of the time synchronization, on the basis of an estimated accuracy of the time synchronization signal on which the last adaptation of the time synchronization is based, and on the basis of an accuracy of a clock of the transceiver module (and/or of the clock of the mobile device). In this process, the estimated accuracy of the time synchronization can be continuously reduced in value (i.e. decreased) on the basis of the length of time since the last adaptation of the time synchronization, on the basis of an estimated accuracy of the time synchronization signal on which the last adaptation of the time synchronization is based, and on the basis of the accuracy of a clock of the transceiver module (and/or of the clock of the mobile device). This accuracy can also be used as the trigger for listening for the respective time synchronization signals. For example, listening 110; 120 for the time synchronization signal (from the mobile device of from a further transceiver module) can be performed if the accuracy of the time synchronization is worse than a threshold value.

If these conditions are satisfied, then the time synchronization is adapted 140. For example in this process, the time synchronization can be derived from the time synchronization signal. For example, the time synchronization signal can have a set relationship to the time synchronization, for instance by the time synchronization signal being transmitted (and hence also received) at a set point in time (time interval) relative to the time synchronization. The method can thus comprise deriving the time synchronization on the basis of a predefined temporal relationship between the time synchronization signal and the time synchronization.

The transceiver module not only receives time synchronization signals from further transceiver modules or from the mobile device, but itself also transmits a time synchronization signal, which, if applicable, can be received by the further (or at least some further) transceiver modules. Thus the method comprises transmitting 150 a time synchronization signal for the further transceiver modules on the basis of the time synchronization between the mobile device and the transceiver module. The transceiver module can use for this purpose the time interval allocated to the transceiver module.

In at least some exemplary embodiments, the time synchronization is adapted in order that the transceiver module is synchronized as closely as possible in time with the mobile device. If the accuracy of the time synchronization is high enough, then the transceiver module can assess more accurately at which points in time the mobile device or the further transceiver modules are transmitting signals relevant to the transceiver module. Hence the transceiver module can control accordingly a receiver component of a transceiver of the transceiver module. For example, the method can comprise adapting 160, on the basis of the adapted time synchronization, a time period intended for receiving signals by a transceiver of the transceiver module. For example, a receive component of the transceiver can be activated in the time period intended for receiving signals, and deactivated otherwise. Hence the method can comprise selective activation of the receive component of the transceiver on the basis of the time synchronization, for instance if the accuracy of the time synchronization is high enough. Said time period intended for receiving signals by the transceiver can be adapted, for receiving a positioning signal from the mobile device, on the basis of the adapted time synchronization. For example, the transceiver may be a UWB transceiver, and the time period intended for receiving signals by the transceiver can be adapted for receiving a UWB positioning signal. For example, the time period intended for receiving signals by the transceiver can be narrowed for receiving a positioning signal from the mobile device to one or more relevant time slots. The receive component can be deactivated, for example, outside the time period.

In exemplary embodiments, the one or more processors 12 can be any programmable controller or processor or a programmable hardware component. For example, the one or more processors 12 can also be implemented as software that is programmed for a corresponding hardware component. In this respect, the one or more processors 12 may be implemented as programmable hardware with suitably customized software. Any processors, for instance digital signal processors (DSPs), can be used here. Exemplary embodiments are not confined to one particular type of processor. Any processors or even a plurality of processors are conceivable for implementing the one or more processors 12.

In exemplary embodiments, the one or more transceivers 14 may also contain typical transceiver components. These may include, for example, one or more antennas, one or more filters, one or more mixers, one or more amplifiers, one or more diplexers, one or more duplexers, etc.

More details and aspects of the method and of the transceiver module are given in conjunction with the concept or examples described above or below (for instance in FIGS. 2 to 6b). The method or the transceiver module can comprise one or more additional optional features, which correspond to one or more aspects of the proposed concept or of the described examples, as were described above or below.

In at least some exemplary embodiments, the transceiver modules are transceiver modules of a vehicle. In this case, it is assumed below that the transceiver modules, or transceiver apparatuses installed in the vehicle, are designed to communicate by means of ultra-wideband communication (UWB) in accordance with IEEE 802.15.4. The illustrated principle can be applied equally to other wireless transmission technologies and protocols, however.

Since the radio interface according to IEEE 802.15.4 used for localization is supported by all the transceiver apparatuses installed in the vehicle, in addition to localization this can also be used for distributing the time synchronization information among the transceiver apparatuses installed in the vehicle (transceiver modules). Since the ranging method standardized in IEEE 802.15.4 is based fundamentally on the precise measurement of time lengths between the sending and receiving of radio messages, then—unlike vehicle bus systems designed solely for data communication—the attributes required for time synchronization of the transceiver apparatuses installed in the vehicle are provided. Although vehicle bus systems do exist that are suitable for time synchronization, the common CAN and LIN systems are in general not suitable for this.

The synchronization protocol presented below is based on the following operating principles:

Each transceiver apparatus installed in the vehicle sends the locally available time synchronization information (as the time synchronization signal) relating to the mobile transceiver apparatus periodically to all the other (further) transceiver apparatuses installed in the vehicle (as a broadcast).

Each transceiver apparatus installed in the vehicle receives the time synchronization information relating to the mobile transceiver apparatus periodically from all the other transceiver apparatuses installed in the vehicle, and compares this with the locally available time synchronization information. If the received time synchronization information is of higher quality (i.e. has a higher estimated accuracy) than the locally available time synchronization information, then the receiving transceiver apparatus replaces the local time synchronization information (i.e. the local time synchronization) with the received time synchronization information of higher quality.

Each transceiver apparatus installed in the vehicle re-evaluates the quality of the locally available time synchronization information for each periodic transmission event in order to be able to make a declaration about the quality of the locally available time synchronization information. For this purpose, for example, the declaration about the quality of the information is downgraded linearly over time by X ppm (parts per million) in order to take account of the maximum deviation guaranteed in the IEEE 802.15.4 standard for the drift in the crystal oscillators in the mobile transceiver apparatus compared with the transceiver apparatus installed in the vehicle.

The following advantageous basic properties apply to the synchronization protocol presented below:

If there is no direct connection between two transceiver apparatuses installed in the vehicle but there is an indirect connection via one (or more) further transceiver apparatuses, then the time synchronization information is transferred with one (or more) periods of delay.

If there are a plurality of indirect connections between two transceiver apparatuses installed in the vehicle then the time synchronization information is transferred over the shortest path (i.e. by the indirect connection that has the shortest delay).

If there is a direct but unstable (i.e. the data communication via the radio channel is error-prone or drops out intermittently) connection between two transceiver apparatuses installed in the vehicle, then the transmission of the time synchronization is delayed until an error-free data transmission is restored for the first time.

An example implementation is shown below.

Exemplary embodiments of the present disclosure are concerned in general with the distribution of time synchronization information by means of UWB. In exemplary embodiments, UWB can be used in order to establish time synchronization between the mobile device and a transceiver module. Thereafter, the time synchronization can be shared with the other transceiver modules.

FIG. 2 shows a timing diagram of time synchronization between a mobile device and a transceiver module. Dual time synchronization is used here. Time synchronization by means of Bluetooth LE is used in order to achieve rough time synchronization. On the basis of this rough time synchronization, the transceiver module can determine a rough time interval in which the transceiver module can receive what is known as a PREPOLL signal (an advance request signal, time synchronization signal/packet). A time frame that is used for the UWB ranging is defined according to this PREPOLL signal.

Inside the time frame for the UWB ranging, the mobile device sends out a POLL signal (a request signal, ranging start signal/packet), which is meant to be received by the transceiver modules. Inside the time frame is also defined for each transceiver module a time slot (labeled here with "Anchor 1" to "Anchor 6", where the example is based on six transceiver modules, also referred to as anchors here). At the end of the UWB ranging time frame, the mobile device sends a "FINAL" signal, followed by a "FINAL_DATA"

signal, which comprises the result of the distance measurement. In this process, time synchronization takes place between the PREPOLL signal and the UWB ranging time frame, and from the UWB ranging time frame to the next POLL signal.

Each anchor should acquire the PREPOLL signal by means of UWB in order to participate in the ranging, for instance by opening a RX time frame/window (a time frame/time window for receiving signals/data, for instance to receive data about the relevant transceiver), around the PREPOLL signal in each ranging cycle. The size of the RX time frame depends on the BLE time synchronization (accuracy: about 1 ms). Each anchor, once it has received the PREPOLL by means of UWB, should open a RX time frame around the POLL signal in each measurement cycle. Each anchor that has received the POLL signal in the current measurement cycle should use the POLL for synchronization with the UWB MAC (Medium Access Control) time grid (accuracy: ~1 µs), respond to the POLL signal in its response slot provided for this purpose, and open a RX time window about the FINAL and FINAL_DATA time intervals in the current measurement cycle. Each anchor that has not received the POLL signal in the current measurement cycle should increase the UWB RX window size by (125-200 ppm, implementation-dependent) for the next cycle.

The present example is based on the time synchronization performed between mobile device and transceiver module, and redistributing this to the further transceiver modules.

FIG. 3 shows a timing diagram of time synchronization between a mobile device and a transceiver module and between different transceiver modules. Each anchor here can transfer with a duty cycle of less than 100% a time synchronization packet (so for instance a time synchronization signal) at its dedicated UWB time synchronization time interval. In the above example having six transceiver modules (anchors), the time interval of the first transceiver module can be the first time interval after FINAL_DATA, the time interval of the second transceiver module can be the second time interval after FINAL-DATA, etc. (with the same fixed sequence as for ranging). The transceiver modules receive, process and forward the time synchronization information to one another. In this process, a RX time window is opened for receiving the time synchronization packets from the other transceiver packets. In a development, each anchor in the same ranging cycle via the PREPOLL signal or the POLL signal can refrain from receiving the time synchronization packets from the other anchors. In a further development, a transceiver module having a current RX time window that is smaller than a threshold value (said time window being based on the estimated accuracy of the time synchronization) can refrain from receiving the time synchronization packets from the other transceivers.

The time synchronization information, for instance the time synchronization signal, for all the ranging sessions collected by the transceiver modules can be sent by means of UWB data packets. The data packets can be sent periodically in the time slices of a time grid after the (or each) ranging cycle. The transceiver module that is acting as the first responder in the ranging session sends a time synchronization packet in the first time interval after the time interval allocated to the FINAL_DATA packet of the ranging session. Similarly, the transceiver module that is acting as the second responder in the ranging session sends a time synchronization packet in the second time interval after the time interval allocated to the FINAL_DATA packet of the ranging session. Similarly, the n'th transceiver module that is acting as the n'th responder in the ranging session sends a time synchronization packet in the n'th time interval after the time interval allocated to the FINAL_DATA packet of the ranging session. It holds here that 1≤n≤number_of_responders, where number_of_responders is transmitted via the vehicle bus to each transceiver module when each ranging session is set up. If there is no time synchronization information available at a transceiver module, the transmission of the time synchronization packet by the transceiver module concerned can be suspended until time synchronization information is available at this particular anchor. FIG. 3 shows the allocation by way of example for number_of_responders=6.

Figure 4:
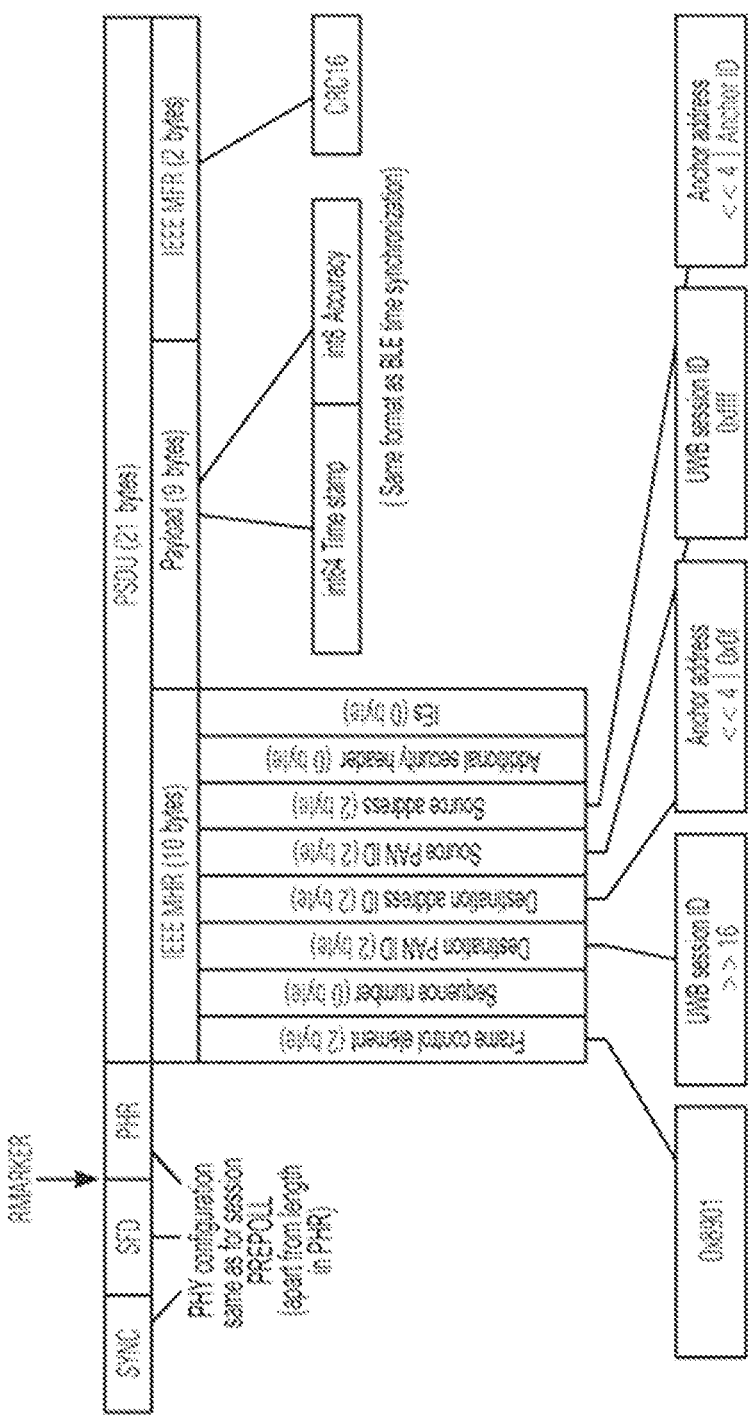
FIG. 4 shows an example packet format.

FIG. 4 shows an example packet format for an example UWB time synchronization packet/signal. The time synchronization packet to be sent in the time interval by each transceiver module for a particular ranging session can have the same PHY (physical layer) and MAC configuration as the PREPOLL packet of the ranging session. In particular, the same SYNC preamble (synchronization preamble) and the same SFD configuration (start frame delimiter) can be used.

The following unencrypted PSDU (physical layer service data unit) can be used for the time synchronization packet:

The PSDU can comprise an IEEE MAC header (MHR) of length 10 bytes. The IEEE MAC payload can comprise time synchronization information and the estimated and/or instantaneous accuracy of the time synchronization information at the time instant of the RMARKER transmission in the time synchronization transmission. In addition, an IEEE MAC footer (MFR) of length two bytes can be used.

The MHR fields can be set as shown in FIG. 4, where "<<" and ">>" refer to bitwise left-shift and right-shift operators, and "&" and "|" refer to bitwise logical AND and OR operations respectively. The MHR may comprise a frame control field of 2 bytes, optionally a sequence number, a destination PAN ID of 2 bytes (for example the UWB session identifier shifted right by 16 bits), a destination address of 2 bytes (for example the anchor address shifted left by 4 bits|0x0f), a source PAN ID of 2 bytes (for example the UWB session identifier & 0xffff), and a source address of 2 bytes (for example anchor address shifted left by 4 bits|anchor identifier). Furthermore, an additional security header and IEs (information elements) can be used here. Information elements are special standardized data fields that can be transferred in the MAC header for standard applications, and for which each receiver knows the standardized meaning of the data. This is in contrast with the payload portion, where any data can be transported, but the receiver needs for decoding purposes a description of the format and meaning. A similar format can also be used for a Bluetooth LE time synchronization.

The anchor identifier can be set according to the time interval of the transceiver module, i.e. 1 for the first responder, 2 for the second etc.

The payload contains the time synchronization information and the information about the accuracy of the time synchronization information. For example, RMARKER from the IEEE 802.15.4 standard is used here as the time reference. The time synchronization information is based on the clock of the transceiver module that is performing the transmission. The accuracy can be adapted for each transmission, and sets the size of the RX time window on the part of the receiving transceiver module.

Each transceiver module can receive the UWB time synchronization packets from the other transceiver modules, and process said packets according to the following method.

Each anchor listens, for example, for incoming UWB packets from other anchors, in the same way as it listens for the UWB packet from the smartphone (mobile device). It is possible to apply dynamic opening of the UWB RX window to the receiving of all the other transceiver-module time synchronization packets.

For example, the transceiver module processes (only) time synchronization packets that have a matching session ID and matching transceiver addresses, as shown in FIG. 4 in the MAC header PAN ID fields, to a configured ranging session in the transceiver module.

Once the UWB time synchronization packet from another transceiver module has been received, the receiving transceiver module performs the following operations:

1. The local clock is used to give the receiving of the RMARKER a time stamp, which results in the time stamp $t_{RMARKER}$ of accuracy $acc_{RMARKER}$.

2. The PSDU time-stamp and accuracy fields can be decoded and saved as $t_{OTHER\_ANCHOR}$ and $acc_{OTHER\_ANCHOR}$.

3. If $acc_{RMARKER} + acc_{OTHER\_ANCHOR}$ is less than (better than) the estimated accuracy of the time synchronization of the receiving transceiver module, then the receiving transceiver module should use $t_{OTHER\_ANCHOR}$ instead of the previous time synchronization.

An example of adapting the time synchronization on the basis of a BLE connection to the phone/mobile device is illustrated below. FIG. 5a shows an example network diagram of a network comprising a mobile device and a plurality of transceiver modules (denoted here as anchors 1 to 6). The arrows between the anchors indicate which anchors are communicating successfully, although not all the connections are used if there are connections with less delay (here, for instance, between anchors 1 and 4). The numbers between the anchors indicate the delay resulting from the sequence of the time intervals. FIG. 5a shows an example of a network diagram, with example numbering of the anchors, and the example of UWB links (between the transceiver modules), at the instant at which transceiver module 5 is performing a BLE time synchronization (arrow between mobile device and anchor 5) with a mobile device. The UWB-link weightings show the number of ranging cycles until the time synchronization information is transferred by each individual anchor after receiving a UWB time synchronization packet. A dashed UWB link between two transceivers is available but not used.

FIG. 5b shows an example timing diagram of time synchronization between a mobile device and a transceiver module and between different transceiver modules, where the original time synchronization is performed by means of Bluetooth Low Energy. FIG. 5b is based on the network diagram of FIG. 5a, and FIG. 6b is correspondingly based on the network diagram of FIG. 6a. Under the assumption that all the transceiver modules are attempting to receive the ranging sessions PREPOLL via a 100% open UWB RX window before time synchronization information is received by means of BLE or UWB, FIG. 5b shows the sequential use of the received time synchronization information in order to reduce the duration of the UWB RX window for the above example network diagram.

In FIGS. 5b and 6b, the time frames in which the respective transceivers are listening for signals are shown hatched, whereas the time intervals in which data is being sent or received is shown in a different hatching. In the example of FIG. 5b, BLE time synchronization takes place between the mobile device and anchor (transceiver module) 5 (via a BLE time synchronization signal from the mobile device). Anchor 5 thereby does not need to listen over the full UWB ranging time frame, but instead listening can be confined to listening for the PREPOLL signal, the POLL signal, the FINAL signal and the FINAL_DATA signal, allowing the receiver component to be switched off in the interim. Anchor 5 is allocated the fifth time interval in the UWB time synchronization time frame, and therefore the anchor transmits a time synchronization signal in this time frame, which is received and processed by anchor 6, as illustrated in FIG. 5a. This anchor in turn transmits a further time synchronization signal, which is received and processed by anchor 6. Thus in the next (n+1'th) UWB ranging time window, the anchors 2, 5 and 6 can control in a targeted manner the receive component of the associated (UWB) transceiver to be active only during the time intervals for PREPOLL, POLL, FINAL and FINAL_DATA. In the UWB time synchronization time window that follows the n+1'th UWB ranging time interval, anchor 2 transmits a time synchronization signal, which is received and processed by the other transceiver modules 1 and 3. In the same UWB time synchronization time window, anchor 3 transmits the received information immediately onto the transceiver module 4. Thus all the anchors can control in a targeted manner the receive component of the associated (UWB) transceiver to be active only during the time intervals for PREPOLL, POLL, FINAL and FINAL_DATA.

A further example illustrates a successive BLE and UWB connection to the phone/mobile device. FIG. 6a shows an example network diagram of a network comprising a mobile device and a plurality of transceiver modules. In this case, as an addition to the network diagram of FIG. 5a, UWB time synchronization takes place between the mobile device and anchor 2. FIG. 6a shows an example of a network diagram, with example numbering of the anchors, and the example of UWB links (between the anchors and between the mobile device and anchor 2), at the instant at which anchor 2 is receiving the first UWB time synchronization information, while all the other anchors are in the state of being synchronized using the BLE time synchronization information via the previous exchange of UWB time synchronization packets resulting from the BLE time synchronization procedure by anchor 5. The UWB-link weightings (between the anchors) show the number of ranging cycles until the time synchronization information is transferred by each individual anchor after receiving a UWB time synchronization packet. The UWB link between anchors 1 and 4 is available but not used.

Under the assumption that all the transceiver modules have received the BLE time synchronization information from anchor 5 via the earlier UWB time synchronization packet exchanges, and are trying to receive the ranging sessions PREPOLL via a reduced UWB RX time window, FIG. 6b shows the sequential use of the improved time synchronization information from anchor 2 as a result of receiving the PREPOLL. FIG. 6b shows an example timing diagram of time synchronization between a mobile device and a transceiver module and between different transceiver modules, where, compared with FIG. 5b, additional time synchronization is performed by means of UWB. In the example of FIG. 6b, anchor 2 receives the PREPOLL signal and the POLL signal from the mobile device, sends a response in its allocated time interval of the UWB ranging time window, and receives the FINAL and FINAL_DATA signals from the mobile device. Thereupon, anchor 2 sends a time synchronization signal in its allocated time interval of the UWB time synchronization time window, which is received and processed by the anchors 1, 3 and 6 (and in the case of anchor 1, is not used until the next time window). On the basis thereof, anchor 3 transmits a time synchronization signal, which is received and processed by anchor 4, and anchor 6 transmits a time synchronization signal, which is received by anchor 5 and is used there in the subsequent UWB time synchronization time window. In the next UWB ranging time window, all anchors can now listen in a targeted manner for the PREPOLL or POLL signal (in the case of anchor 2), and, because the time synchronization is now accurate enough, can refrain from listening for time synchronization signals from the other anchors/transceiver modules.

The aspects and features described together with one or more of the examples and figures detailed above can also be combined with one or more of the other examples in order to replace an identical feature of the other example or to introduce the feature into the other example.

Examples may also be, or relate to, a computer program comprising program code for performing one or more of the above methods when the computer program is executed on a computer or processor. Steps, operations or processes of various methods described above can be performed by programmed computers or processors. Examples may also include program storage means, for example digital data storage media, which are machine-readable, processor-readable or computer-readable and encode programs of instructions, which programs can be executed by a machine, processor or computer. The instructions execute, or cause the execution of, some or all of the steps of the above-described methods. The program storage means may comprise or be, for example, digital memories, magnetic storage media such as magnetic disks and magnetic tapes, hard disk drives or optically readable digital data storage media. Further examples may also include computers, processors or control units which are programmed to perform the steps of the above-described methods, or (field) programmable logic arrays ((F)PLAs) or (field) programmable gate arrays ((F)PGAs) which are programmed to perform the steps of the above-described methods.

The description and drawings present only the principles of the disclosure. Moreover, all the examples set out here are expressly intended fundamentally for illustrative purposes only in order to assist the reader in understanding the principles of the disclosure and the concepts contributed by the inventor(s) for developing the technology further. All statements here relating to principles, aspects and examples of the disclosure and specific examples thereof include their counterparts.

Functions of various elements shown in the figures, including every function block designated a "means", "means for providing a signal", "means for producing a signal", etc. can be implemented in the form of dedicated hardware, for instance "a signal provider", "a signal processing unit", "a processor", "a controller", etc., and also as hardware capable of executing software in conjunction with associated software. In the case of provision by a processor, the functions can be provided by a single dedicated processor, by a single shared processor, or by a plurality of individual processors, all or some of which can be shared. The term "processor" or "controller" is in no way limited to hardware that is capable solely of executing software, but can comprise DSP hardware (DSP=digital signal processor), network processor, application specific integrated circuit (ASIC), field programmable gate array (FPGA), read only memory (ROM) for storing software, random access memory (RAM) and non-volatile storage means. Other hardware, conventional and/or customized, can also be included.

A block diagram, for example, can present an outline circuit diagram that implements the principles of the disclosure. Likewise, a flow diagram, a flow chart, a state-transition diagram, a pseudocode and such like can represent different processes, operations or steps, which are presented, for example, mainly in a computer-readable medium and hence are executed by a computer or processor, regardless of whether such a computer or processor is shown explicitly. Methods disclosed in the description or in the claims can be implemented by a component comprising means for performing each of the respective steps of these methods.

It shall be understood that the disclosure of a plurality of steps, processes, operations or functions disclosed in the description or the claims shall not be interpreted as being in the specified order unless stated otherwise explicitly or implicitly, for instance for technical reasons. Therefore the disclosure of a plurality of steps or functions does not restrict these to a specific order unless these steps or functions are not interchangeable for technical reasons. In addition, in some examples, a single step, function, process or operation can include a plurality of substeps, subfunctions, subprocesses or sub-operations and/or can be broken down into same. Such substeps can be included and be part of the disclosure of this single step unless explicitly excluded.

Furthermore, the following claims are hereby incorporated in the detailed description, where each claim can stand alone as a separate example. Although each claim can stand alone as a separate example, it should be noted that—even though a dependent claim can refer in the claims to a specific combination with one or more other claims—other examples can also include a combination of the dependent claim with the subject matter of every other dependent or independent claim. Such combinations are proposed here explicitly unless stated that a certain combination is not intended. In addition, it is intended that features of one claim are included for every other independent claim even if this claim is not made directly dependent on the independent claim.

The invention claimed is:

1. A method for adapting a time synchronization between a mobile device and a transceiver module of a plurality of transceiver modules, wherein the method is performed by the transceiver module, the method comprising:

listening, in at least some of a plurality of time slots, for a time synchronization signal from a further transceiver module of the plurality of transceiver modules, wherein the plurality of transceiver modules are arranged at different positions in a vehicle, wherein each time slot of the plurality of time slots is allocated to a corresponding transceiver module of the plurality of transceiver modules;

adapting the time synchronization when a received time synchronization signal has a higher estimated accuracy than the time synchronization between the mobile device and the transceiver module; and transmitting a time synchronization signal for the further transceiver modules based at least in part on the time synchronization between the mobile device and the transceiver module; and adapting an estimated accuracy of the time synchronization based at least in part on a length of time since the last adaptation of the time synchronization, based at least in part on an estimated accuracy of the time synchronization signal on which the last adaptation of the time synchronization is based, and based at least in part on an accuracy of a clock of the transceiver module.

2. The method as claimed in claim 1, further comprising listening, in a predefined time slot, for a time synchronization signal from the mobile device.

3. The method as claimed in claim 2, wherein the listening for the time synchronization signal from the mobile device is performed when the estimated accuracy of the time synchronization is less than a threshold value.

4. The method as claimed in claim 1, further comprising adapting, based at least in part on the adapted time synchronization, a time period intended for receiving signals by a transceiver of the transceiver module.

5. A method for adapting a time synchronization between a mobile device and a transceiver module of a plurality of transceiver modules, wherein the method is performed by the transceiver module, the method comprising:
  listening, in at least some of a plurality of time slots, for a time synchronization signal from a further transceiver module of the plurality of transceiver modules, wherein the plurality of transceiver modules are arranged at different positions in a vehicle, wherein each time slot of the plurality of time slots is allocated to a corresponding transceiver module of the plurality of transceiver modules;
  adapting the time synchronization when a received time synchronization signal has a higher estimated accuracy than the time synchronization between the mobile device and the transceiver module; and
  transmitting a time synchronization signal for the further transceiver modules based at least in part on the time synchronization between the mobile device and the transceiver module, adapting, based at least in part on the adapted time synchronization, a time period intended for receiving signals by a transceiver of the transceiver module,
  wherein the time period intended for receiving signals by the transceiver is adapted, for receiving a positioning signal from the mobile device, based at least in part on the adapted time synchronization.

6. The method as claimed in claim 1, wherein the time synchronization signal from the further transceiver module is based on an ultra-wideband transmission technology, and/or wherein a time synchronization signal from the mobile device is based on an ultra-wideband transmission technology or a Bluetooth transmission technology.

7. The method as claimed in claim 5, wherein the plurality of transceiver modules are arranged at different positions in a vehicle.

8. A transceiver module comprising:
  one or more processors; and
  one or more transceivers, wherein the transceiver module is configured to adapt a time synchronization between a mobile device and the transceiver module by:
    listening by means of a transceiver of the one or more transceivers, in at least some of a plurality of time slots, for a time synchronization signal from a further transceiver module of a plurality of transceiver modules, wherein each time slot of the plurality of time slots is allocated to a corresponding transceiver module of the plurality of transceiver modules, wherein the plurality of transceiver modules comprises the transceiver module;
    adapting the time synchronization when a received time synchronization signal has a higher estimated accuracy than the time synchronization between the mobile device and the transceiver module; and
    transmitting, by means of the transceiver, a time synchronization signal for the further transceiver module based at least in part on the time synchronization between the mobile device and the transceiver module; and
  wherein the transceiver module is further configured to adapt an estimated accuracy of the time synchronization between the mobile device and the transceiver module based at least in part on a length of time since the last adaptation of the time synchronization, based at least in part on an estimated accuracy of the time synchronization signal on which the last adaptation of the time synchronization is based, and based at least in part on an accuracy of a clock of the transceiver module.

9. The transceiver module of claim 8, wherein the received time synchronization signal and the transmitted time synchronization signal comprise information about an estimated accuracy of a time synchronization signal concerned.

10. The transceiver module of claim 8, wherein the transceiver module is further configured to adapt an estimated accuracy of the time synchronization between the mobile device and the transceiver module by listening, in a predefined time slot, for a time synchronization signal from the mobile device.

11. The transceiver module of claim 10, wherein the transceiver module is configured to listen for the time synchronization signal from the mobile device when an estimated accuracy of the time synchronization is less than a threshold value.

12. The transceiver module of claim 8, wherein the transceiver module is further configured to adapt an estimated accuracy of the time synchronization between the mobile device and the transceiver module by adapting, based at least in part on the adapted time synchronization, a time period intended for receiving signals by a transceiver of the transceiver module.

13. The transceiver module of claim 12, wherein the time period intended for receiving signals by the transceiver is adapted, for receiving a positioning signal from the mobile device, based at least in part on the adapted time synchronization.

14. The transceiver module of claim 8, wherein the time synchronization signal from the further transceiver module is based on an ultra-wideband transmission technology, and/or wherein a time synchronization signal from the mobile device is based on an ultra-wideband transmission technology or a Bluetooth transmission technology.

15. The transceiver module of claim 8, wherein the plurality of transceiver modules are arranged at different positions in a vehicle.

* * * * *